Figure 1:
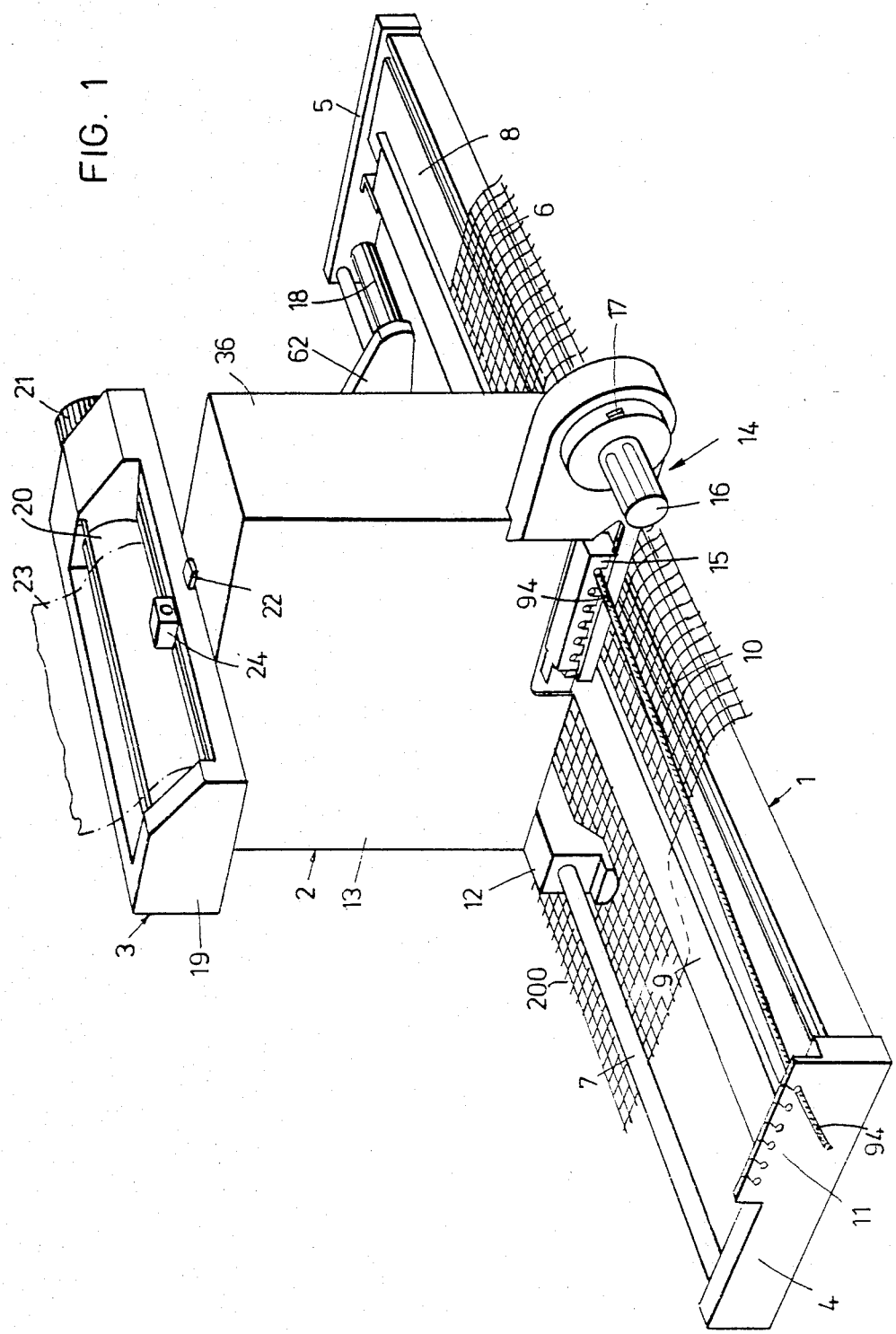

United States Patent [19]

Rosenberg

[11] Patent Number: 4,533,163
[45] Date of Patent: Aug. 6, 1985

[54] METHOD AND APPARATUS FOR MAKING KNOTTED RUGS

[75] Inventor: Stephan Rosenberg, Muri, Switzerland

[73] Assignee: MADAG Maschinen- und Apparatebau Dietikon AG, Zurich, Switzerland

[21] Appl. No.: 506,619

[22] Filed: Jun. 22, 1983

[30] Foreign Application Priority Data

Jun. 28, 1982 [CH] Switzerland ............... 3954/82

[51] Int. Cl.³ .................................. B65H 69/04
[52] U.S. Cl. ................................. 289/1.5; 289/18.1
[58] Field of Search ............ 289/1.5, 2, 17, 18.1

[56] References Cited

U.S. PATENT DOCUMENTS

| | | | |
|---|---|---|---|
| 3,379,222 | 4/1968 | Fleischer et al. | 139/6 |
| 3,415,558 | 12/1968 | Holzknecht | 289/18.1 X |
| 4,423,894 | 1/1984 | Kaufmann | 289/18.1 X |

FOREIGN PATENT DOCUMENTS 1121267 1/1962 Fed. Rep. of Germany .
205242 10/1923 United Kingdom .
1276508 6/1972 United Kingdom ............ 289/18.1

*Primary Examiner*—Louis K. Rimrodt
*Attorney, Agent, or Firm*—Oblon, Fisher, Spivak, McClelland & Maier

[57] ABSTRACT

Through operation of a driving crank, the knotting apparatus is advanced over the canvas holder, on the one hand, and the various tools for the knotting operation are actuated, on the other hand. By means of drawing tongs (95) comprising two gripping arms (74, 92) the yarn (94) is pulled into the region of a needle head (103). With the front ends of two snaring arms (78,79) a cut-off piece of yarn is hung over the needle head (103). By means of two cross-arms guided parallel to the needle head, the ends of the piece of yarn are led through an aperture in the needle pushed through the canvas, whereupon the needle is retracted in order to form the knot. The desired color can be selected by means of a color selector (14). The method and apparatus make it possible to knot yarn (94) of selectively different colors rapidly and uniformly to the canvas.

16 Claims, 37 Drawing Figures

FIG. 12
FIG. 13
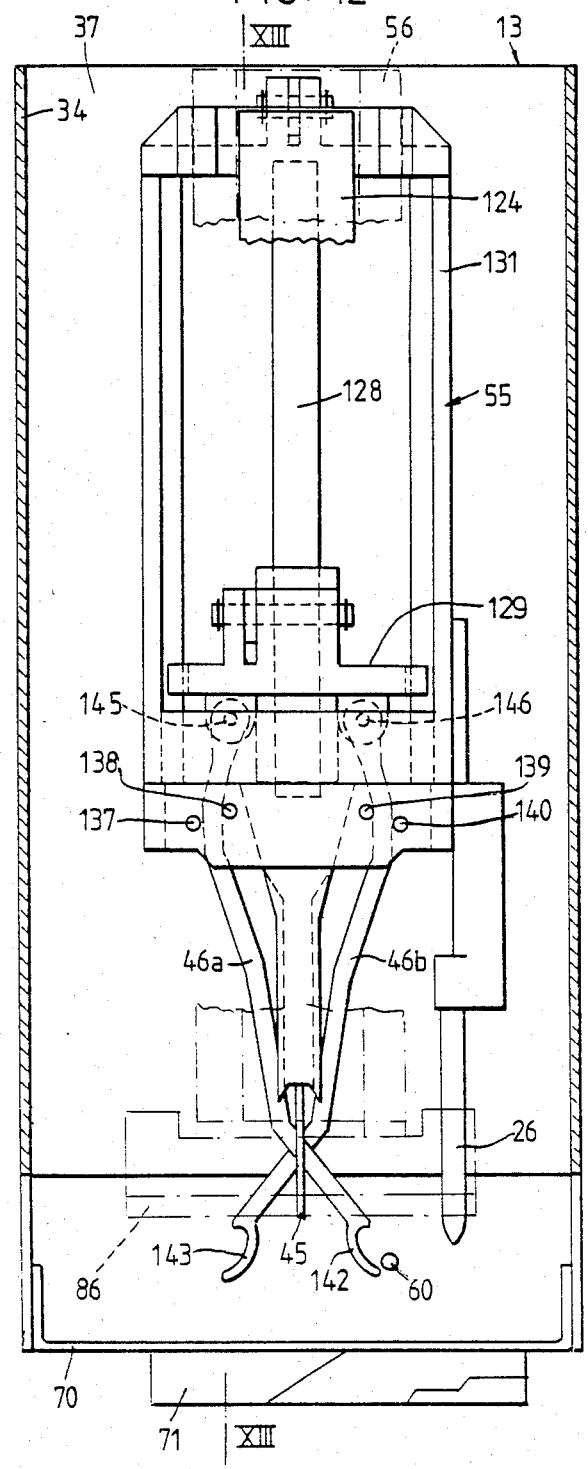
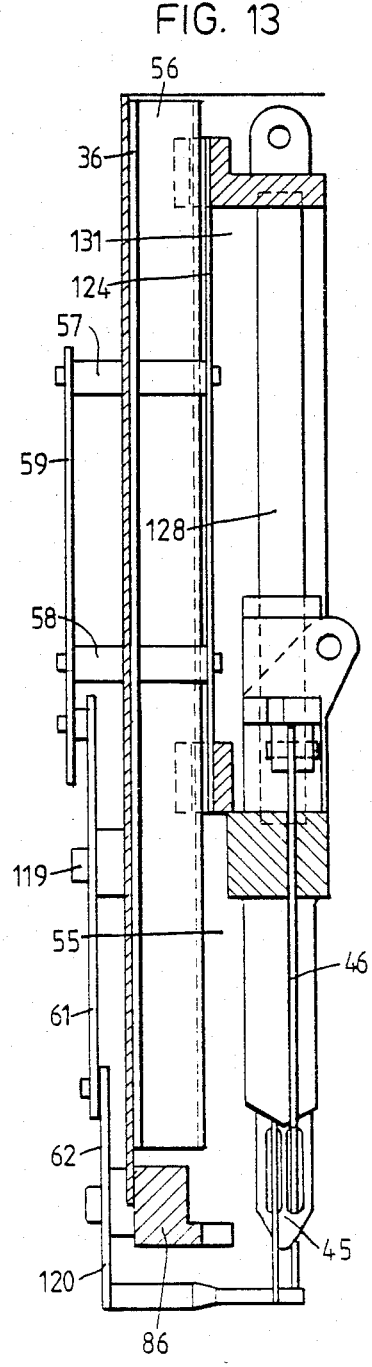

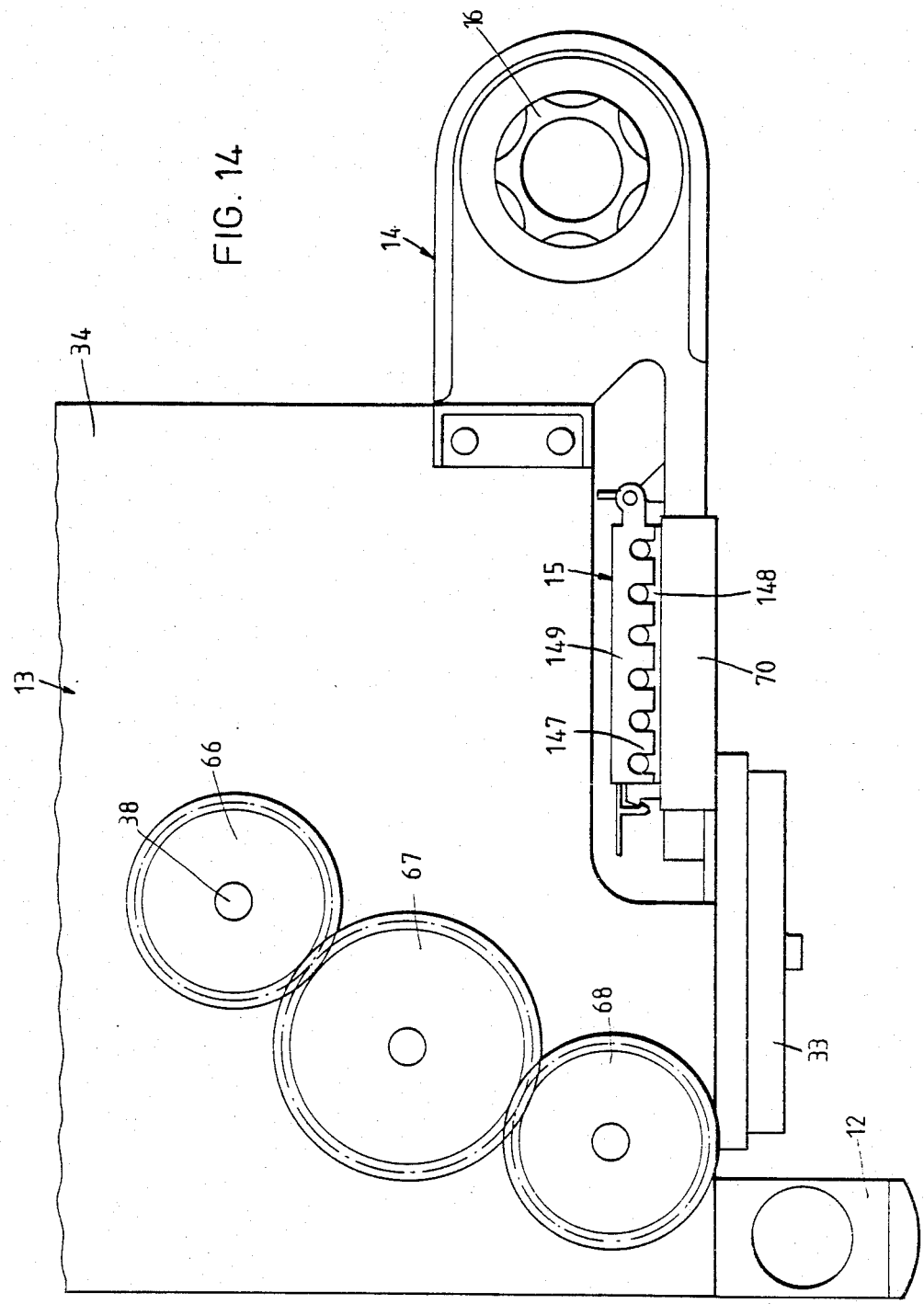

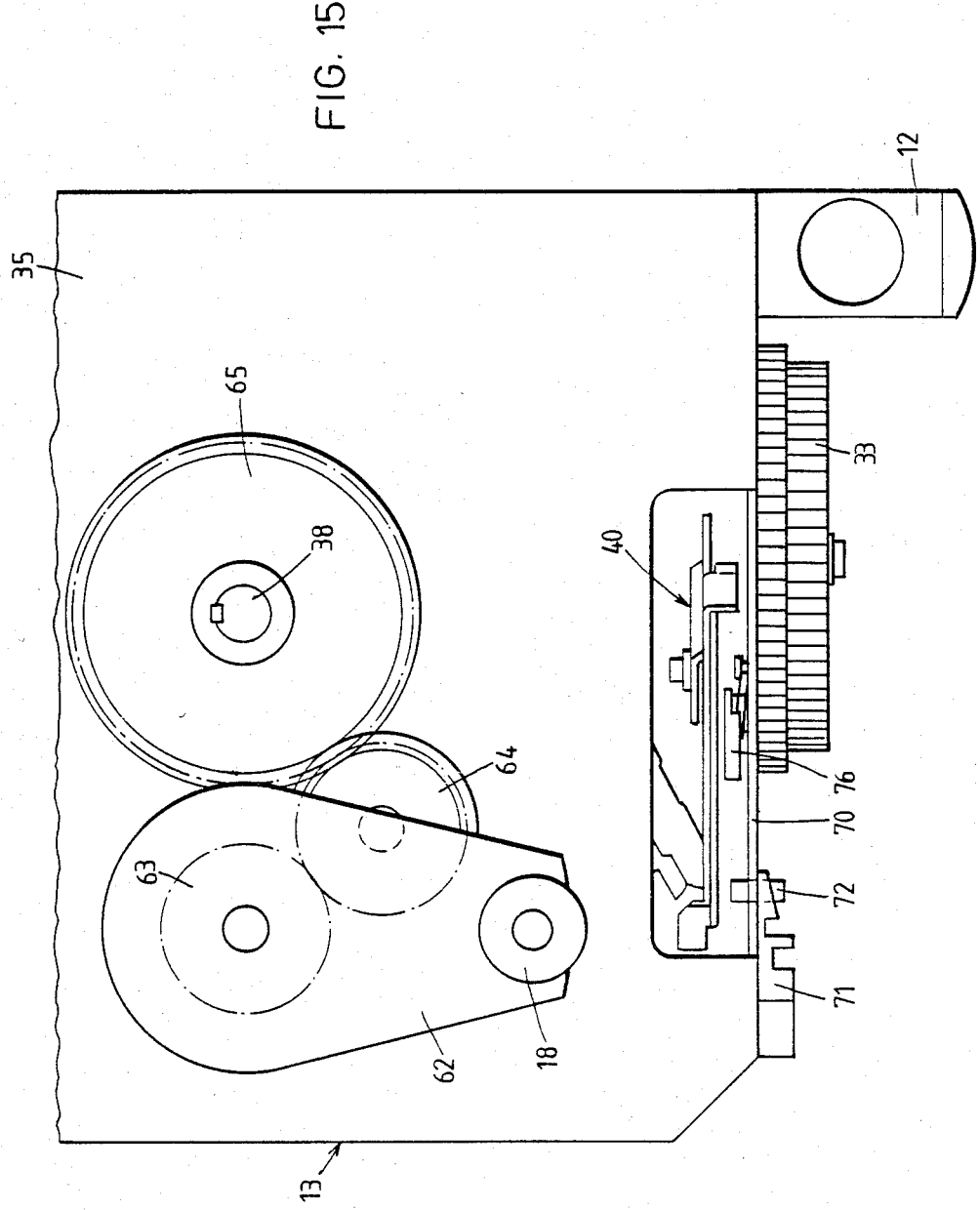

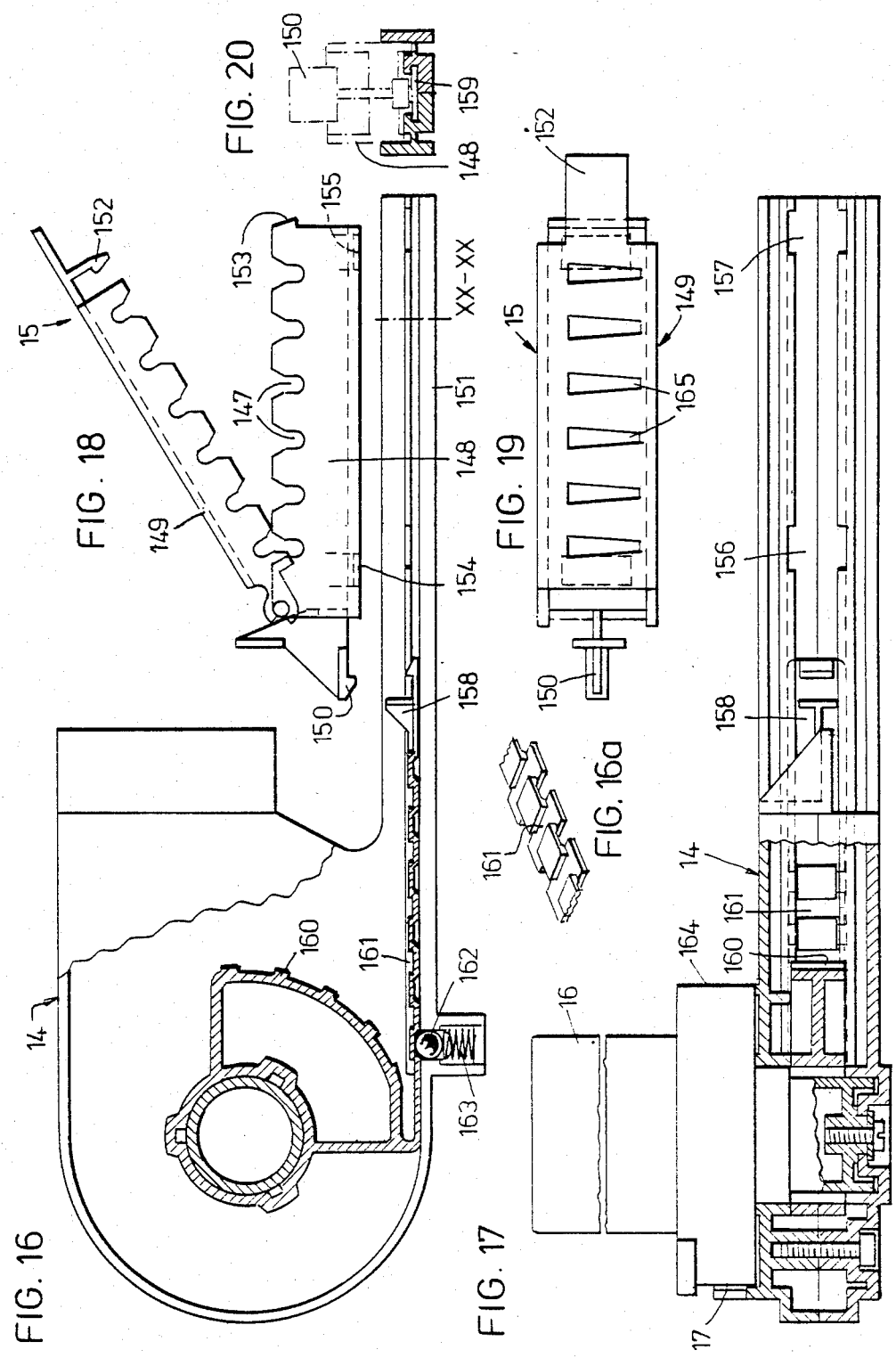

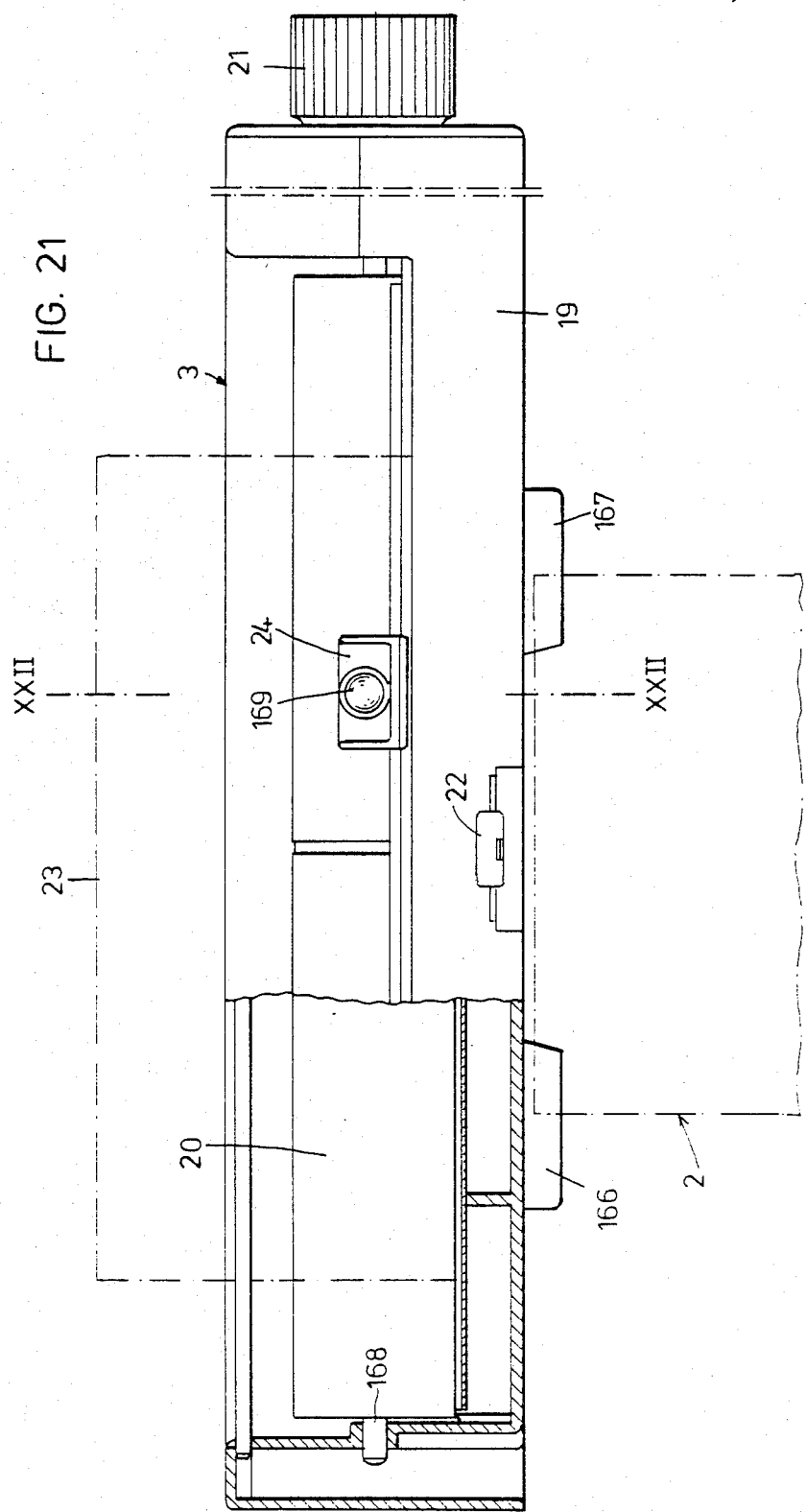

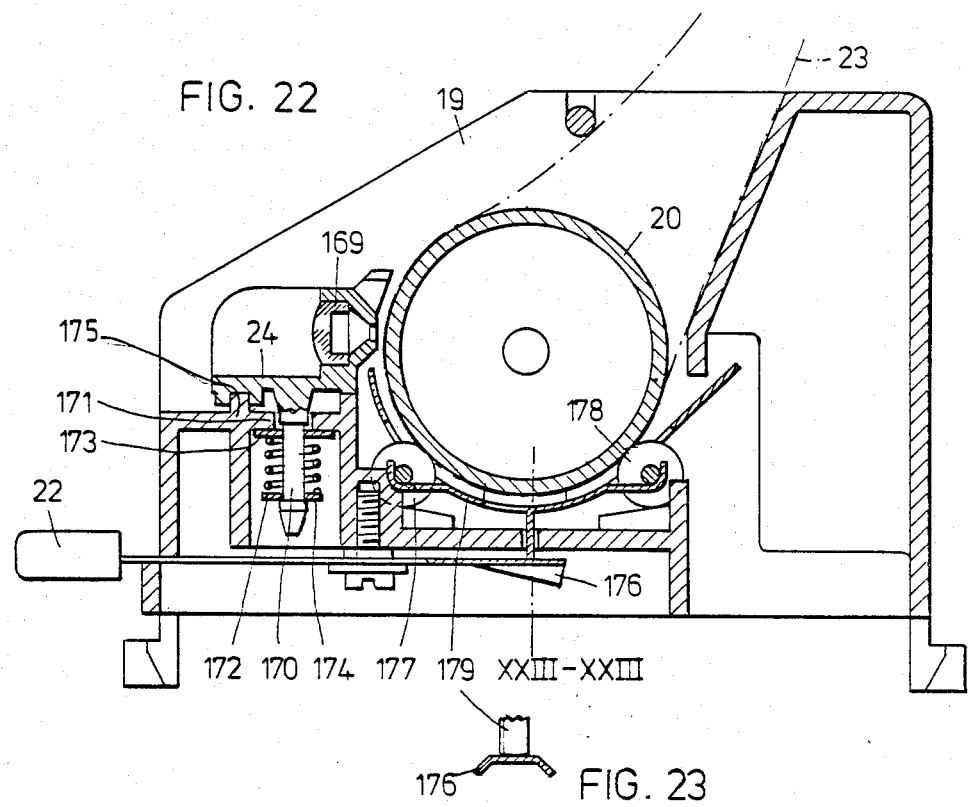
FIG. 22
FIG. 23
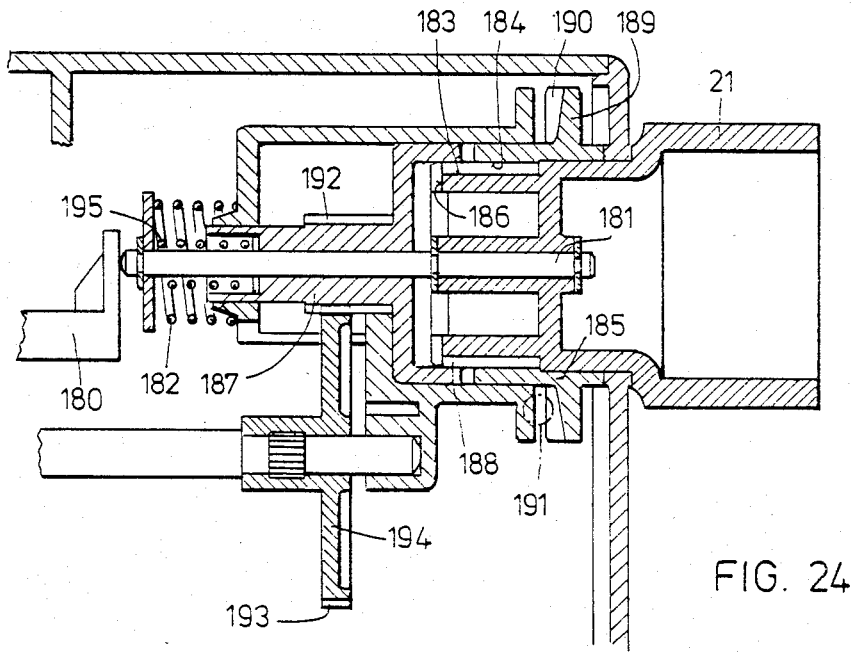
FIG. 24

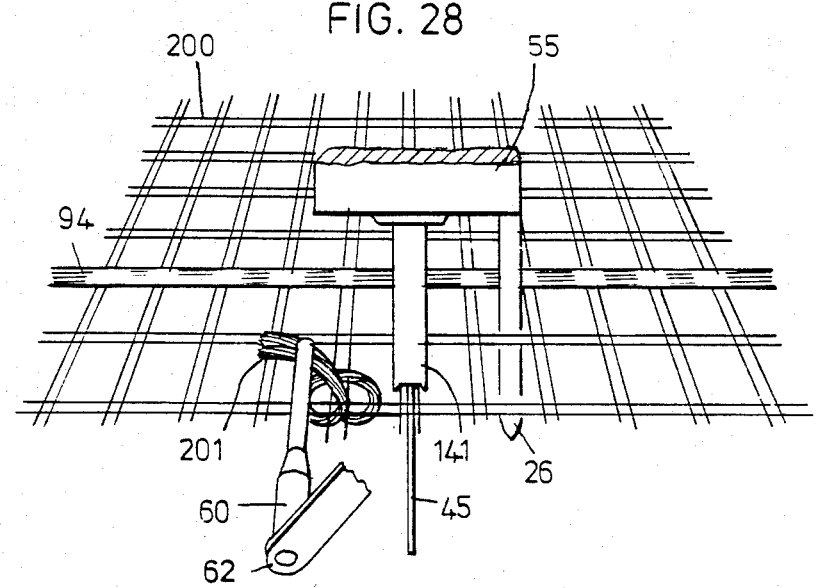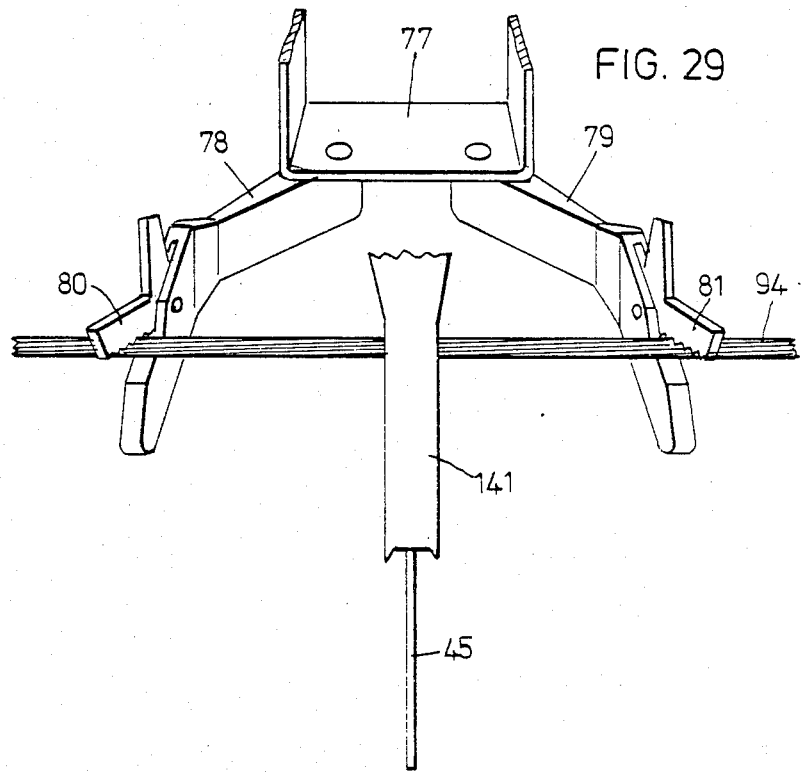

FIG. 30
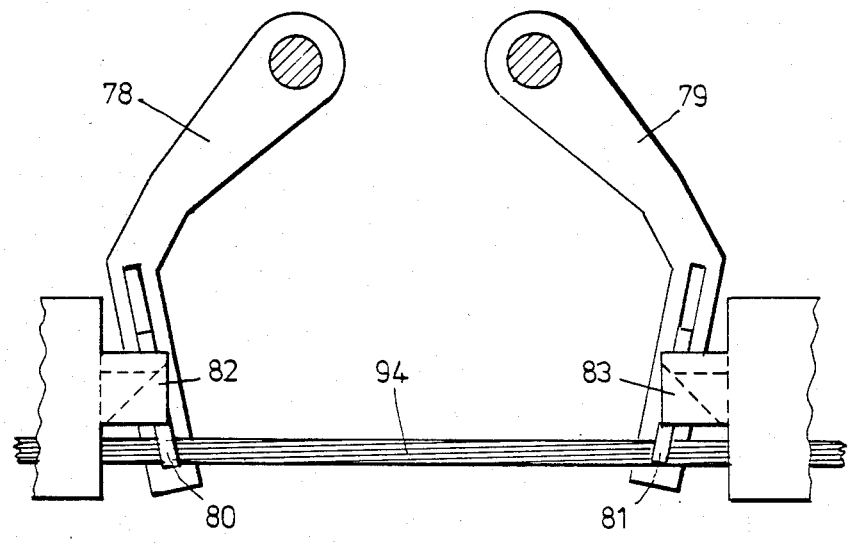
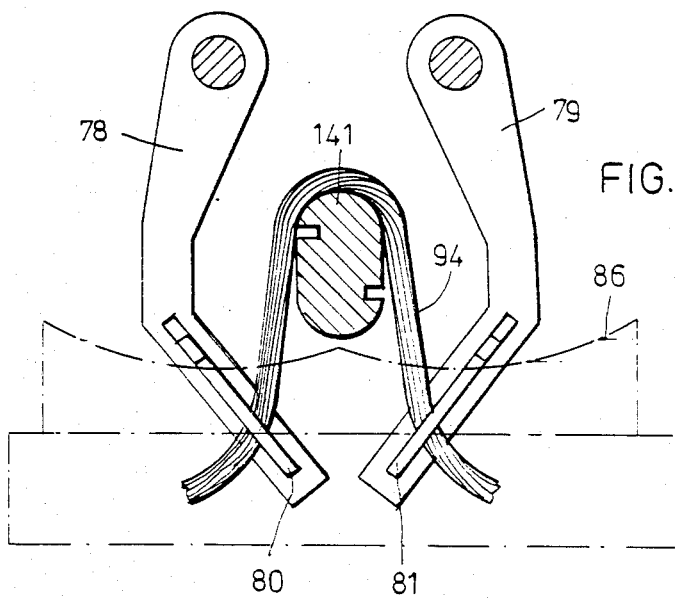
FIG. 31

1

METHOD AND APPARATUS FOR MAKING KNOTTED RUGS

This invention relates to rug making, and more particularly to a method and apparatus for making knotted rugs. The method is of the type wherein a knotting device is transported by a drive mechanism over canvas fixed on a canvas holder, and feed means are provided for the knotting yarn. The apparatus for carrying out the method is of the type having a drive mechanism and feed means as aforementioned.

Apparatus for making yarn rugs semiautomatically is available in commerce. Such apparatus is transported over the canvas by a manual drive, each piece of yarn being folded in the middle and inserted between two threads of the canvas so that it forms a loop and the two ends of the piece stand out above the canvas. After all pieces of yarn have been inserted, a coat of glue is applied to the underside of the canvas. One disadvantage of this prior art apparatus is that the individual pieces of yarn are not knotted to the canvas but glued to it. Such glued rugs feel hard to the touch and may suffer damage under the influence of dampness.

Furthermore, a hand-operated knotting device is described in German Pat. No. 1,121,267, by means of which pieces of yarn already cut to the proper length are individually knotted to the canvas. A drawback of this apparatus is that working speed is only about twice as great as in the case of knotting solely by hand.

It is an object of this invention to provide an improved method and apparatus for making knotted rugs wherein the yarn is knotted to the canvas without the necessity of gluing, and wherein the knotting speed is substantially higher than with prior art knotting apparatus.

A further object of this invention is to provide a method and apparatus for making knotted rugs wherein various kinds of yarn can be used without the necessity of cutting them separately to the proper size prior to use.

To this end, in the method according to the present invention, of the type initially mentioned, cam plates are set in rotation by means of the drive mechanism for actuating the various tools for carrying out the knotting operation, the yarn to be knotted being pulled into the knotting zone by means of a first yarn-transport means, the yarn being conveyed into the region of a needle by means of a second yarn-transport means, the needle pushed through the canvas and a piece of yarn cut off, whereupon the piece of yarn is conveyed by both ends through the needle aperture by a third yarn-transport means, and the needle is pulled back in order to form a knot.

The apparatus according to the present invention, also of the type initially mentioned for carrying out the foregoing method, comprises cam plates rotatable by the drive mechanism for actuating the various tools for carrying out the knotting operation, there being provided a first yarn-transport means for transporting the yarn from the feed means to the knotting zone, a second yarn-transport means for conveying the yarn into the region of a needle, and a third yarn-transport means for conveying the yarn through an aperture provided for in the needle, as well as a cutting-off means.

Figure 2:
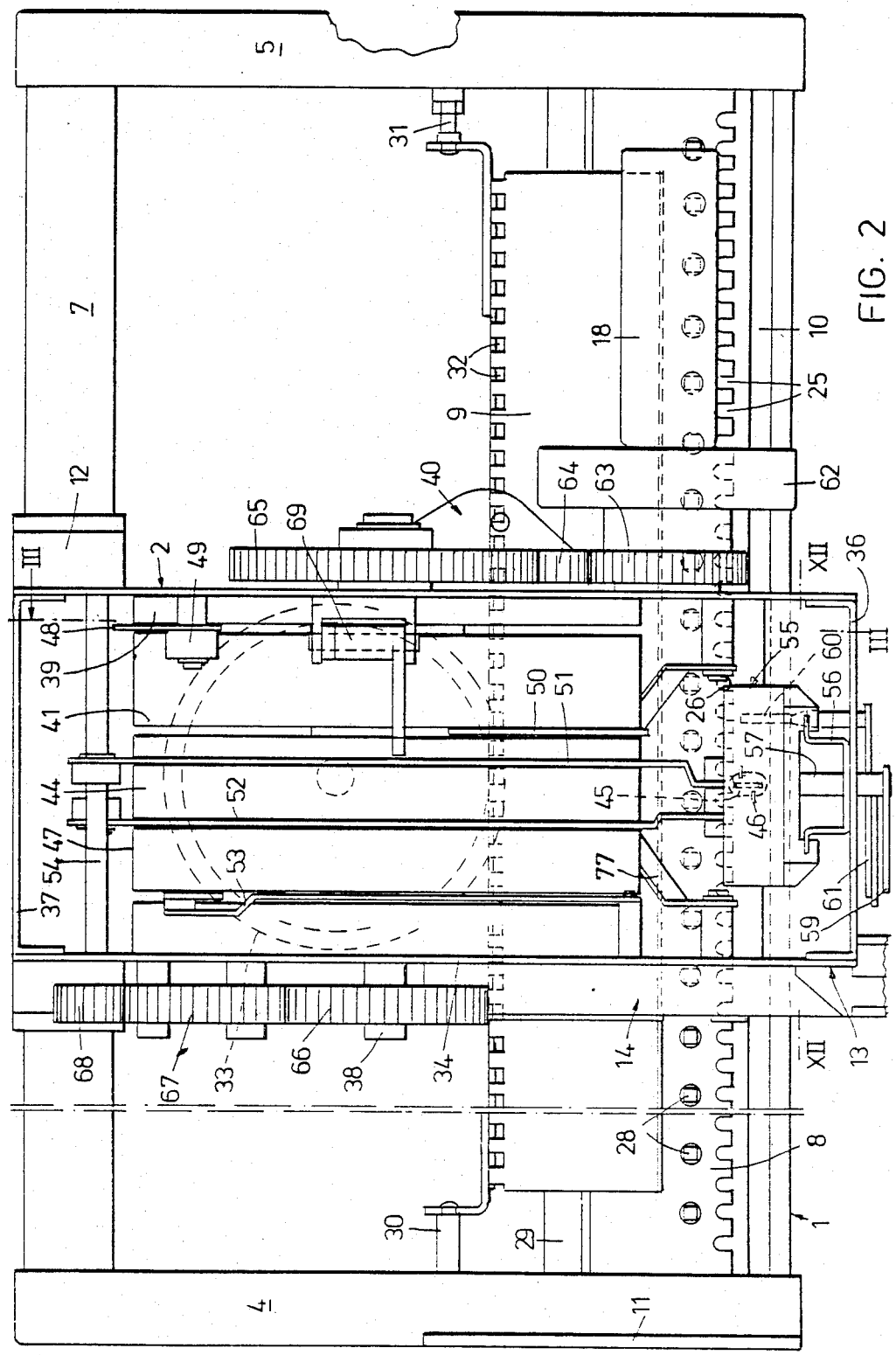
Figure 3:
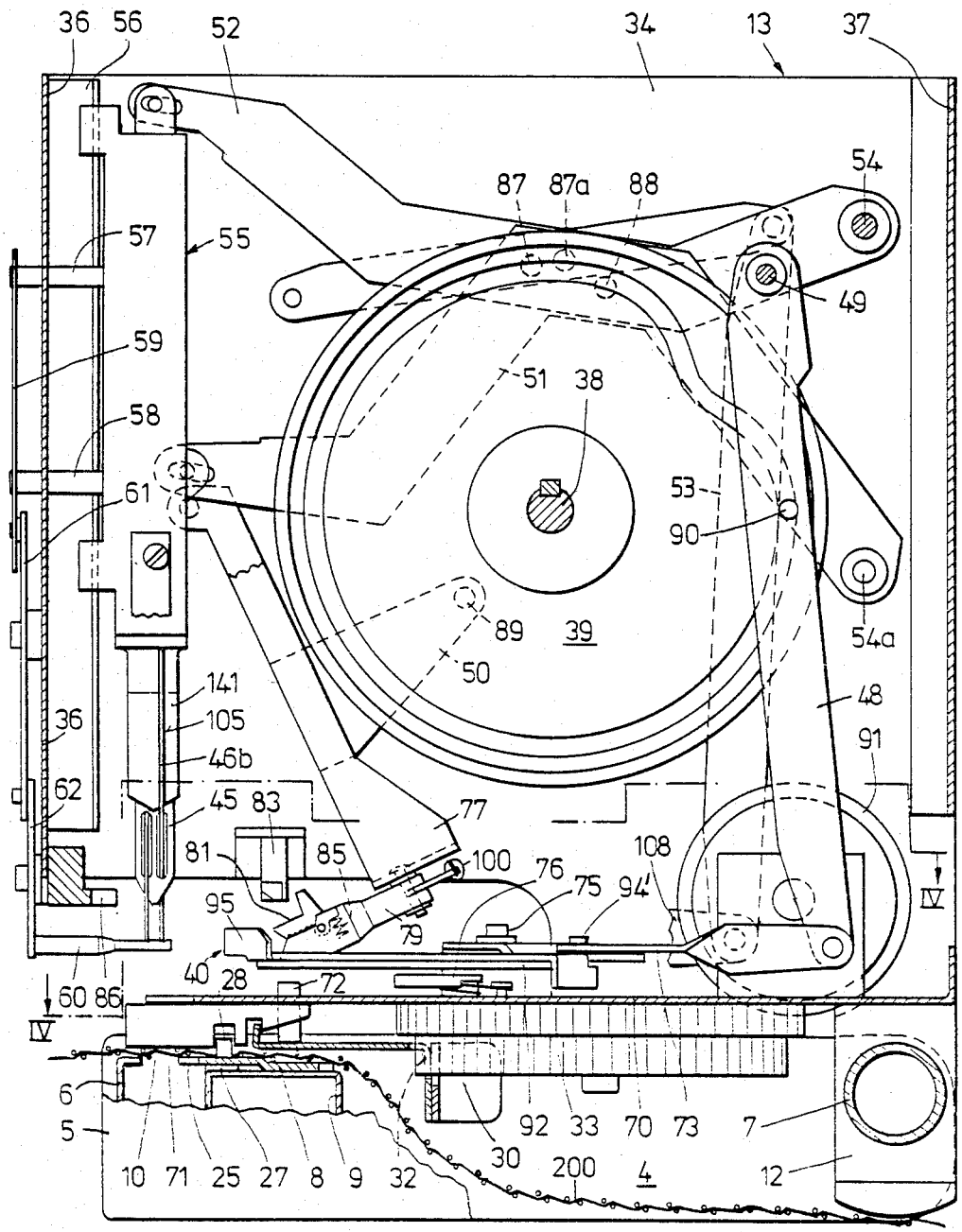
Figure 4:
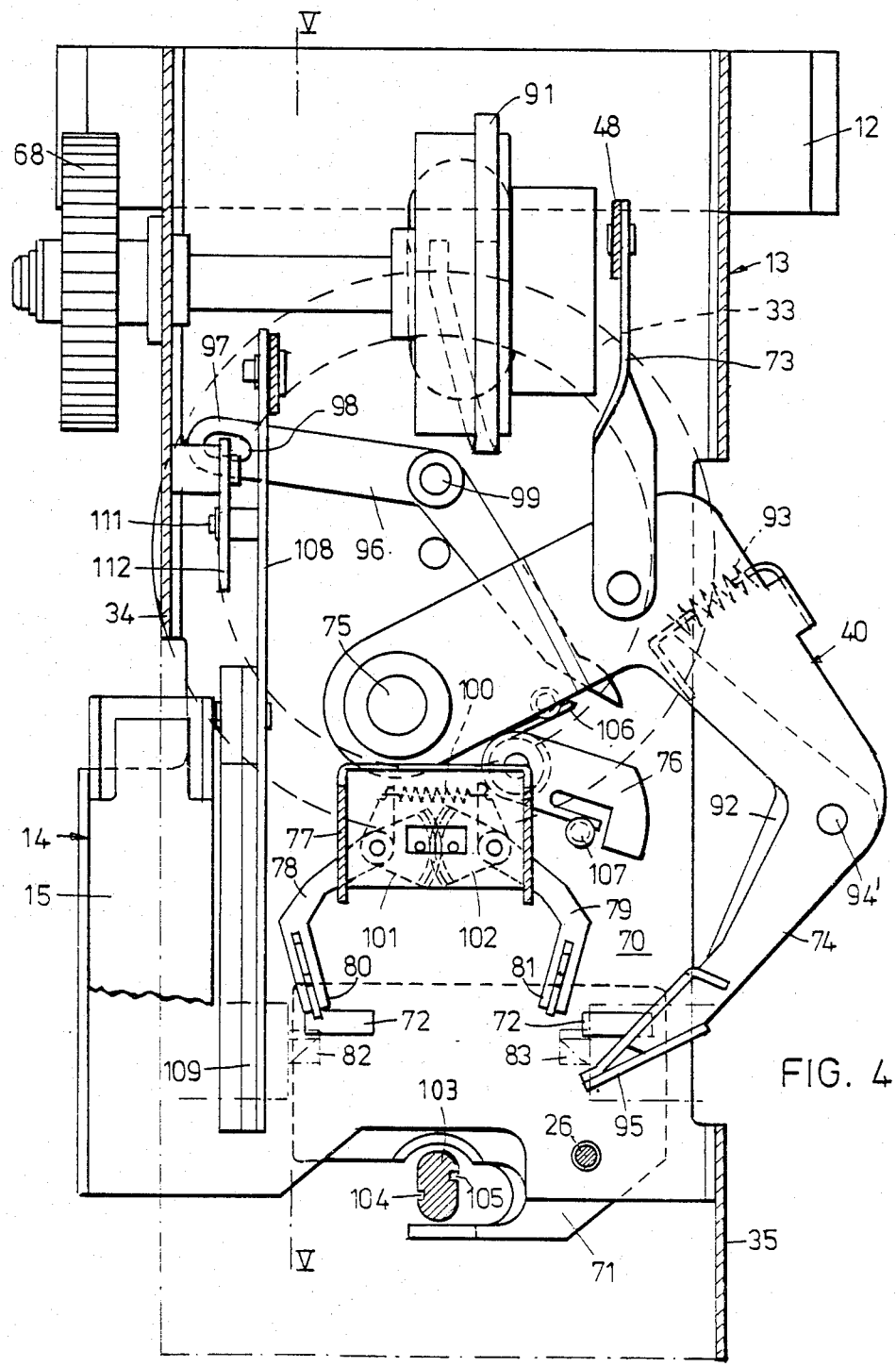
Figure 5:
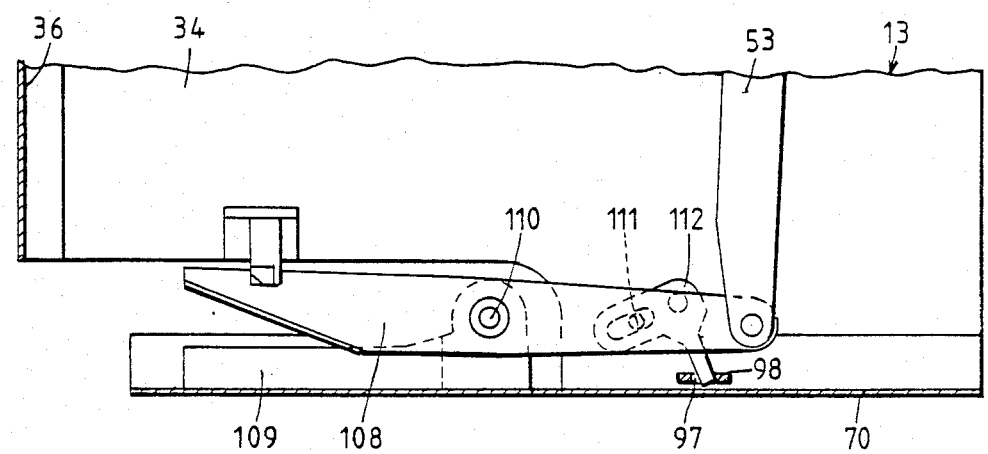
Figure 6:
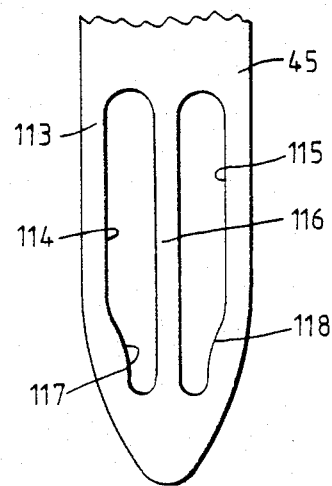
Figure 7:
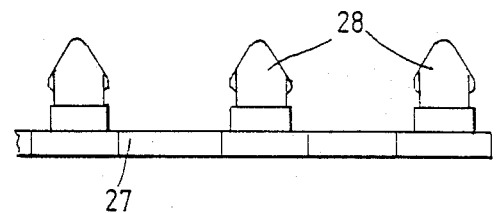
Figure 8:
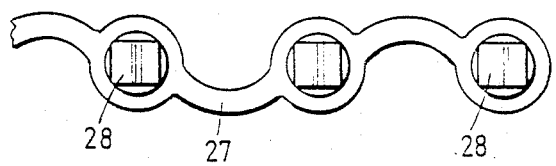
Figure 9:
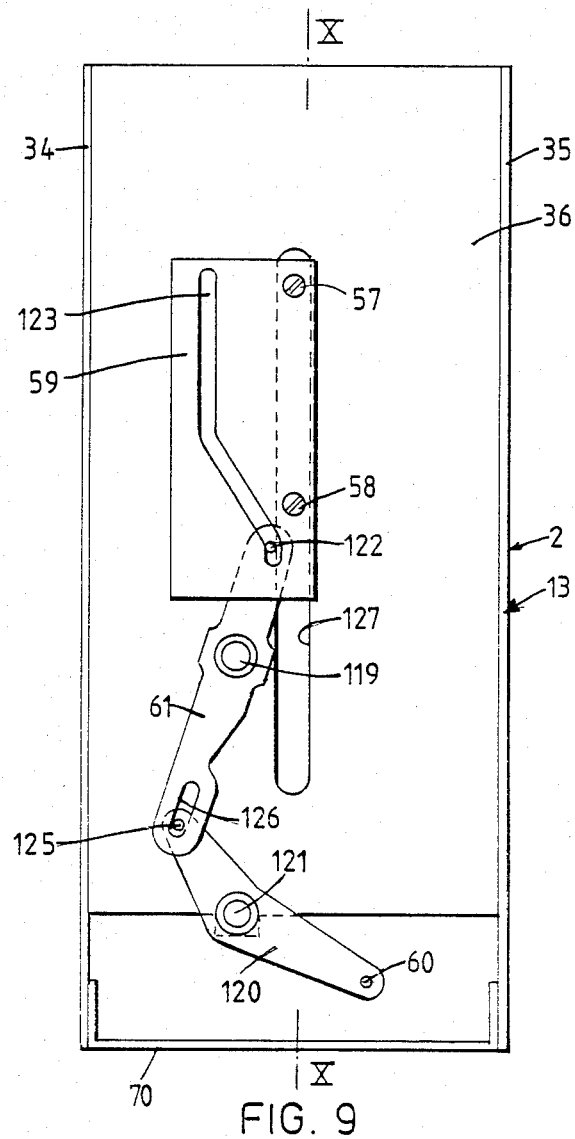
Figure 10:
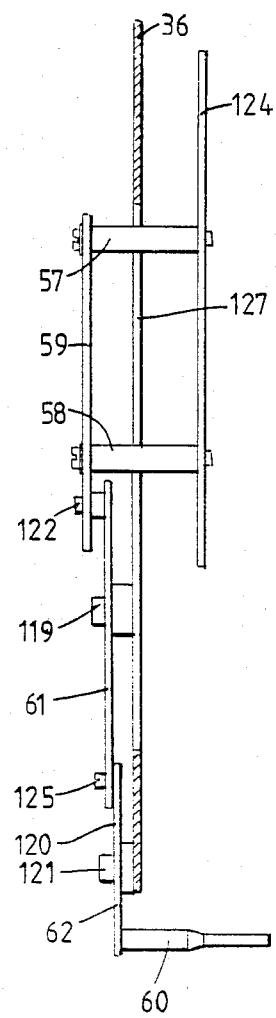
Figure 11:
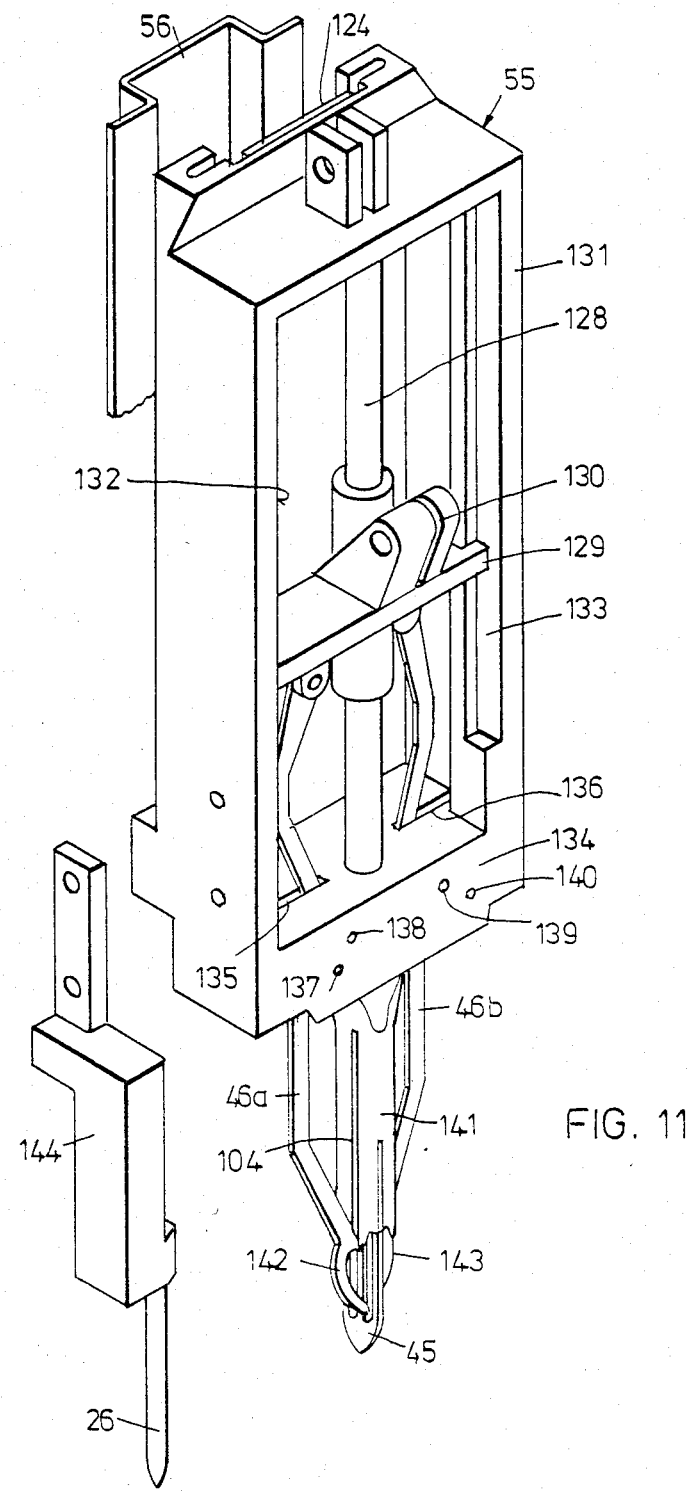
Figure 25:
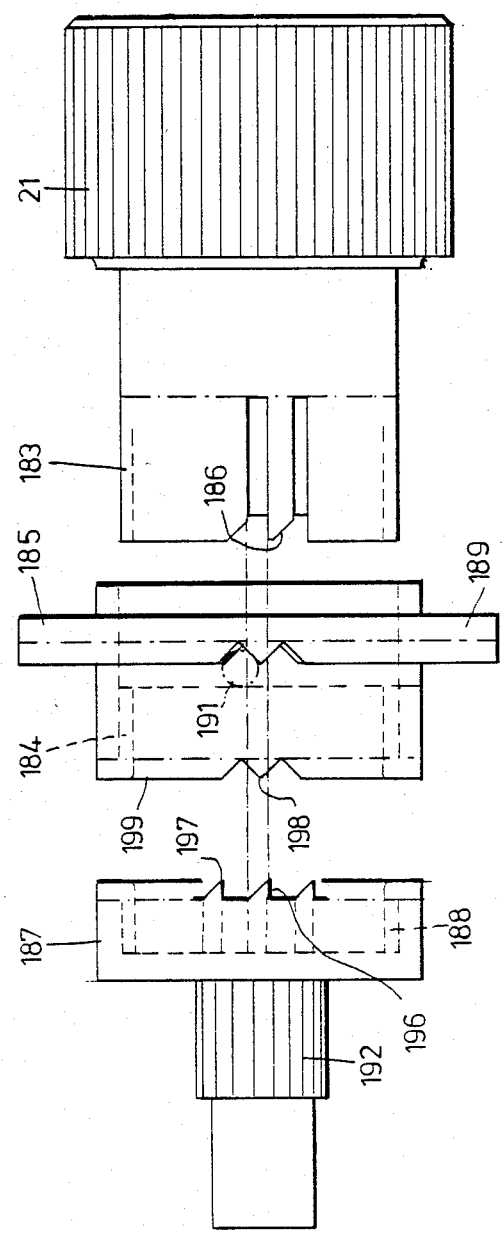
Figure 35:
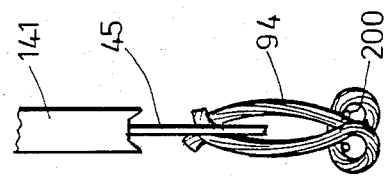
Figure 36:
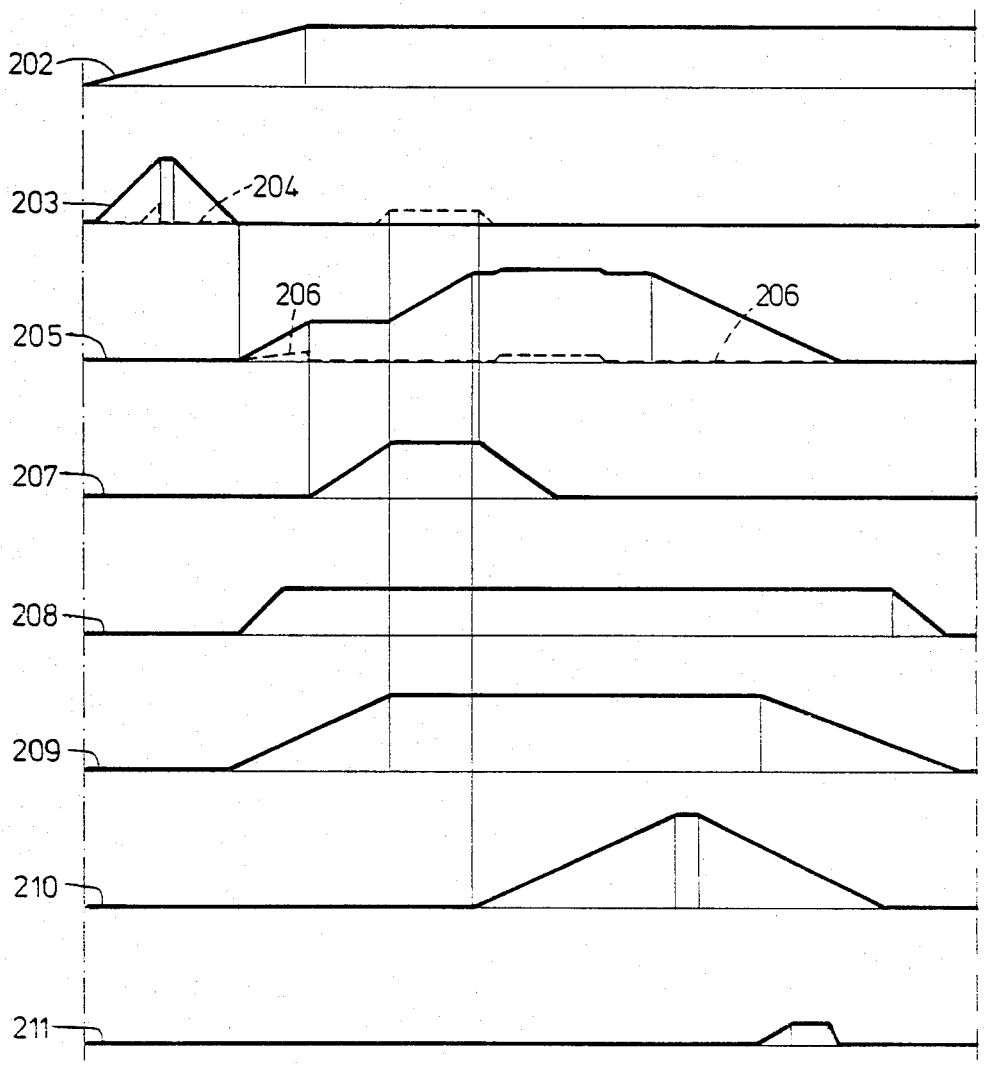

Preferred embodiments of the invention will now be described in detail with reference to the accompanying drawings, in which:

FIG. 1 is an overall perspective view of the knotting apparatus with knotting bed and pattern reader,
FIG. 2 is a top plan view of the knotting apparatus opened at the top and of the knotting bed,
FIG. 3 is a section taken on the line III—III of FIG. 2,
FIG. 4 is a section taken on the line IV—IV of FIG. 3,
FIG. 5 is a vertical section taken on the line V—V of FIG. 4,
FIG. 6 is a front view of the end of the needle,
FIG. 7 is an elevation of the comb,
FIG. 8 is a top plan view of the comb,
FIG. 9 is an elevation of the wool barrier,
FIG. 10 is a section taken on the line X—X of FIG. 9,
FIG. 11 is a perspective view of the knotting head,
FIG. 12 is a section taken on the line XII—XII of FIG. 2,
FIG. 13 is a longitudinal section taken on the line XIII—XIII of FIG. 12,
FIGS. 14 and 15 are elevations of the knotting apparatus from the left and right respectively, as viewed in FIG. 1,
FIG. 16 is an elevation of the color selector, partially broken away and in section,
FIG. 16a is a perspective view of part of the catch strip,
FIG. 17 is a top plan view of the color selector,
FIG. 18 is an elevation of the yarn cassette,
FIG. 19 is a top plan view of the yarn cassette,
FIG. 20 is a section taken on the line XX—XX of FIG. 16,
FIG. 21 is a view of the pattern reader, partially broken away and in section,
FIG. 22 is a cross-section taken on the line XXII—XXII of FIG. 21,
FIG. 23 is a section taken on the line XXIII—XXIII of FIG. 22,
FIG. 24 is a longitudinal section through the pattern reader,
FIG. 25 is an exploded elevation showing the individual gears of the pattern reader,
FIGS. 26–35 are views illustrating the movements of the individual tools of the knotting apparatus, and
FIG. 36 is a graph showing the course of these movements as curves.

In FIG. 1, a knotting apparatus 2 is shown mounted on a knotting bed 1. A pattern reader 3 is mounted on the knotting apparatus 2. As viewed in FIG. 1, the left-hand sidewall 4 and the right-hand sidewall 5 of the bed 1 are connected at the front by a front wall 6 and at the rear by a guide bar 7. A canvas holder 8 adjoins the front wall 6 for supporting a length of canvas 200. A rack rail 9 is held between the sidewalls 4 and 5 in such a way that it can be swivelled upwards. A worm gear (not shown in FIG. 1) engages the rack rail 9 for the purpose of moving the knotting apparatus 2 over the knotting bed 1. The space between the front wall 6 and the canvas holder 8 serves as a knotting groove 10. A yarn holder 11 is provided on the left-hand sidewall 4 for guiding yarn of various colors, e.g., the yarn 94.

The knotting apparatus 2 is movable laterally on the bed 1 by means of a carrier slide 12 guided by the guide bar 7. At the left of a housing 13 of the apparatus 2, as viewed in FIG. 1, is a color selector 14 comprising a yarn cassette 15, a setting knot 16 for selecting the yarn, and a color index 17. A driving crank 18, including a crank arm 62, is used for moving the apparatus 2 across the bed 1. An electric motor might be used instead of the crank 18.

The pattern reader 3 on top of the apparatus 2 comprises a housing 19, a cylinder 20, a knob 21 for turning the cylinder 20 by hand, a release-lever button 22 for use when inserting or withdrawing a pattern 23, and a color indicator with magnifying glass 24 for reading from the pattern 23.

FIG. 2 shows the knotting bed 1 again, in detail. The canvas holder 8 has at its front end, as viewed in FIG. 2, gripping teeth 25 for insertion of a centering pin 26 of the knotting apparatus 2. Behind the gripping teeth 25 is a so-called gripping comb 27 (FIG. 3) with lugs 28 for holding the canvas projecting beyond the canvas holder 8. Between the canvas holder 8 and the rack rail 9 there is also a support 29 secured to the sidewalls 4 and 5. The rack rail 9, which can be swivelled upwards about two pivot mountings 30 and 31, must be thus lifted when, after knotting of one row, the canvas is freshly set. For transporting the apparatus 2, a cogwheel 33 provided thereon engages teeth 32 at the back, as viewed in FIG. 2, of the rack rail 9. The bed 1 may be extended by means of intermediate pieces so that very wide rugs can also be made.

The housing 13 of the knotting apparatus 2 comprises a left-hand sidewall 34, a right-hand sidewall 35 (FIG. 4), a front wall 36, and a rear wall 37. Within the housing 13, a number of cam plates are mounted on a common shaft 38, viz., a cam plate 39 for controlling a wool drawer 40, a cam plate 41 for controlling two snaring arms 78 and 79 (FIG. 4), a cam plate 44 for controlling a needle 45 and two cross-arms 46a and 46b, and a cam plate 47 for controlling the cutting movement.

A driving lever 48 for the wool drawer 40, actuated by the cam plate 39, is mounted on a journal 49, while the snaring arms 78 and 79 are controlled by a driving lever 50. By means of the cam plate 44 for controlling the needle 45 and cross-arms, a driving lever 51 for the needle 45 and a driving lever 52 for the cross-arms 46a and 46b are actuated. A driving lever 53 for cutting and for reopening the gripping arms 74, 92 (described hereinafter) is actuated by the cam plate 47 for controlling the cutting operation. The driving levers 51 and 52 for the needle 45 and for the cross-arms 46a and 46b are mounted on a shaft 54 and on a shaft 54a, respectively, as shown in FIG. 3.

The needle 45 and the cross-arms 46a and 46b are disposed on a knotting head 55 movable up and down. The knotting head 55 is guided in a guide rail 56. A slide plate 59 for controlling a wool barrier is connected to the knotting head 55 via a spacer bolt 57 and a spacer bolt 58 shown in FIG. 3. A deflector pin 60 is moved via a driving lever 61 controlled by the slide plate 59.

The driving crank 18 is connected via the crank arm 62 to a gear train 63–65 which drives the various cam plates, the gear 65 being mounted on the shaft 38. At the other end of the shaft 38 is a further gear train 66–68 for driving a worm gear (not shown in FIG. 2). Also to be seen is a driving lever 69 for actuating the pattern reader 3, which indexes the cylinder 20 with the pattern 23 (FIG. 1) by one step after tying of a knot. A swinging arm 77 will be described below with reference to FIG. 3.

The various driving levers actuating the tools for carrying out the knotting operation are also shown in FIG. 3, in side elevation. Provided on a base plate 70 of the housing of the knotting apparatus is a knotting foot 71. Rolls 72 for a low-friction movement of the knotting apparatus on the rack rail 9 are secured to the knotting foot 71. The drive lever 48 of the wool drawer 40 is connected to a gripper main arm 74 (FIG. 4) via an intermediate lever 73. The arm 74 is rotatingly secured to a bearing bolt 75 and is opened by means of a pawl 76. The driving lever 50 for the snaring arms 78 and 79 is connected to the swinging arm 77. The front parts of the snaring arms 78 and 79 each have at the top a pawl 80, 81. By means of control slides 82 and 83, the pawls are briefly opened upon movement of the arm 77 towards the knotting head 55. The pawls 80, 81 are held in their closed position by springs 84 and 85. A front control slide 86 attached to the front wall 36 brings the snaring arms 78 and 79 together again. FIG. 3 further shows the driving lever 52 for the needle 45, as well as cams 87, 87a, 88, 89, and 90 affixed to lever 51 for the cross-arms, to lever 53 for cutting and for reopening the gripper arms 74 and 92, and to the driving lever 48 for the wool drawer 40, which cams are guided in the corresponding grooves in the cam plates. FIG. 3 also shows a worm gear 91 for actuating the drive cogwheel 33.

The gripper main arm 74 and a movable gripper arm 92 are more clearly visible in FIG. 4. A compression spring 93 presses the arm 74 and the arm 92 together in the normal position. When the arm 92 moves towards the wool cassette 15, the pawl 76 rotates the arm 92 about a bearing bolt 94' against the pressure of the spring 93. The wool drawer 40 is thus ready to put the yarn 94 contained in the cassette 15 into the drawing tongs 95. As the gripping arms 74, 92 of the wool drawer 40 continue the rotary movement about the bearing bolt 75, the movable gripper arm 92 slips over the pawl 76 and is again pressed against the gripper main arm 74 by the pressure of the spring 93. The strand of wool is thereby firmly situated in the drawing tongs 95. A lever 96 for reopening the gripping arms 74, 92 is likewise actuated by the driving lever 53 for carrying out the cutting movement. This second opening of the gripping arms 74 and 92 takes place after the backward movement thereof into approximately the position shown in FIG. 4. The end portion 97 of the lever arm 96 contains a groove 98 which receives an angle lever 112 rotation of which causes the lever 96 to rotate about a pivot pin 99.

As may likewise be seen from FIG. 4, the two snaring arms 78 and 79 are kept in an opened position by a spring 100.

The rearward end of each of the snaring arms 78 and 79 has a toothed segment 101 and 102, respectively, for positive cooperation. A needle head 103 guided in the knotting head 55 has two lateral grooves 104 and 105 for guiding the cross-arms 46a and 46b. The pawl 76 is furthermore provided with a spring 106 which presses it against a stop 107.

FIG. 5 shows a cutting knife 108 actuated by the driving lever 53. Between the knife 108 and a counterknife 109, the yarn is cut off each time. The cutting knife 108 is rotatingly secured to a pivot pin 110. By means of a cam 111 on the knife 108, the angle lever 112 is rotated. As previously explained, the angle lever 112 engages the slot 98 in the lever 96 for reopening the gripping arms.

FIG. 6 is a front elevation of the end 113 of the needle 45. There are two vertical apertures 114 and 115 separated by a fillet 116. The apertures 114 and 115 are somewhat tapered at their lower ends 117 and 118. By means of the fillet 116, friction is decreased between the two yarn ends led through the needle 45 during knotting.

In FIGS. 7 and 8, the comb 27 with the lugs 28 for holding the canvas is illustrated in elevation and in plan.

FIGS. 9 and 10 show the wool barrier in elevation and in section. The driving lever 61 is pivotingly mounted on a pin 119, and a rocking lever 120 is pivotingly mounted on a pin 121. A cam 122 at the top of the driving lever 61 engages a groove 123 in the slide plate 59. When the knotting head 55 secured to a mounting plate 124 moves vertically, the slide plate 59 which is also secured to the mounting plate 124 by the spacer bolts 57 and 58 is likewise displaced vertically. The driving lever 61 is then rotated about the pivot pin 119, which results in swivelling of the rocking lever 120 about the pivot pin 121. A cam 125 fixed to the rocking lever 120 engages a slot 126 in the driving lever 61. At the other end of the rocking lever 120, the deflector pin 60 is fixed. Upon a vertical movement of the knotting head, 55, the two spacer bolts 57 and 58 are guided in a vertical slot 127 provided in the front wall 36.

The knotting head 55 according to FIG. 11 is guided in the knotting-head guide 56. A guide column 128 disposed on the vertical axis of the knotting head 55 is used for the vertical displacement of a slider 129 for the cross-arms 46a and 46b, which are secured thereto. At the top of the slider 129 is a bearing 130 for coupling-on the driving lever 51. The knotting head 55 itself is essentially formed of a yoke 131, having guide ribs 132 and 133 therein for the slider 129, and of a guide block 134. In the block 134 are slots 135 and 136 through which the cross-arms 46a and 46b pass. Disposed at right angles to the two slots 135 and 136 are two guide pins each, 137, 138 and 139, 140, respectively, which control the movement of the cross-arms 46a and 46b. Adjacent to the bottom of the guide block 134 in the vertical axis is the needle neck 141, in which the needle 45 is inserted. The cross-arms 46a and 46b are guided along the needle neck 141 in the grooves 104 and 105. The end portions 142 and 143 of the cross-arms 46 are bent. The centering pin 26 is fixed to the yoke 131 by means of a holding block 144.

The knotting head 55 is also illustrated in two sectional views in FIGS. 12 and 13. The guiding of the cross-arms 46a and 46b between the pins 137 and 138 and between the pins 139 and 140 is even more clearly apparent. The cross-arms 46a and 46b are rotatingly secured to the slider 129 by means of tongues 145 and 146. In these drawing figures, the knotting head 55 is shown in its starting position.

FIG. 14 is a view of the knotting apparatus looking from the left-hand side of FIG. 1. The gear 66 operated by the driving crank 18 drives, via the idler gear 67, the gear 68 mounted on the same shaft as the worm gear 91. The yarn cassette 15 has six openings 147 for the insertion of yarn of various colors. The cassette comprises essentially a bottom 148 and a cover 149. By means of the setting knob 16, the yarn cassette 15 is displaced horizontally so that the yarn of the desired color is brought into the knotting zone.

FIG. 15 is a view of the knotting apparatus looking from the right-hand side of FIG. 1. The gear 63 is set in rotation by means of the crank 18 via the crank arm 62. The gear 65 connected to the shaft 38 on which the cam plates are situated is driven via the idler gear 64.

In FIGS. 16, 17, and 18, the color selector 14 is illustrated in elevation and in plan, and the cassette 15 is shown in elevation. A coupling 150 on the cassette 15 is used to hook the bottom of the cassette into a guide rail 151. By means of the two parts 152 and 153 of a snap closure, the cover 149 can be locked to the bottom 148 after insertion of the various yarns. Guide studs 154 and 155 on the bottom of the yarn cassette are inserted in matching openings 156 and 157 in the bottom of the color selector 14, and the cassette is then slid towards the left, as viewed in the drawings, until the coupling 150 snaps into the mating piece 158, the guide studs 154 and 155 being guided in a guide groove 159. A winding sector 160 is fixed to the setting knob 16 of the color selector for rotation with that knob. The winding sector 160 is connected to a coupling piece 158 for the yarn cassette 15 via a catch strip 161, part of which is shown in perspective in FIG. 16a. A stop roller 162 is pressed by a spring 163 against the catch strip 161 so that when the setting knob 16 is turned, the roller snaps into six different positions of the catch strip in order to bring whichever color of yarn is desired into the knotting zone. By means of a dial 164 connected to the hand knob 16 and the color index 17 disposed under this dial, the desired yarn color can be selected.

FIG. 19, a top plan view of the yarn cassette 15, shows plastic springs 165 provided on the cover 149. When the cassette is closed, these springs press against the individual strands of yarn and keep them from slipping back and forth in the cassette. On the other hand, the frictional force exerted by the springs 165 is just great enough that the strand of yarn can still be pulled through the notches 147 in the bottom and in the cover of the yarn cassette by means of the wool drawer 40.

In FIG. 20, a sectional view of the guide 151 rail and the yarn cassette 15, the cross-section of the guide grove 159 for the guide studs 154 and 155 may be seen.

FIG. 21 is a view of the pattern reader 3 which can be mounted on the knotting apparatus 2 by means of two plug devices 166 and 167. The cylinder 20 with the pattern 23, borne on a spindle 168, is rotated by the driving lever 69 of the knotting apparatus after the tying of each knot until the next place on the pattern appears under the color indicator 24 with the magnifying glass 169. The pattern sheets 23 are glued together "endlessly," each revolution corresponding to one knotting row. After the knotting of a row, the color indicator is displaced one step by hand. Long rugs can be produced by means of several sheets.

As may be seen in FIG. 22, the color indicator 24 is held in a guide groove 171 by a guide pin 170. A spring 174 held between two discs 172 and 173 increases the frictional force upon reciprocation of the color indicator on its guide rail 175. By means of the release-lever button 22, via a locking spring 176, rolls 177 and 178 for guiding the pattern 23 can be pressed against the cylinder 20 and released. The rolls 177 and 178 are held by a support 179 which can be displaced by means of the button 22.

FIG. 23 is a section taken on the line XXIII—XXIII of FIG. 22.

FIG. 24, a longitudinal section through the pattern device, shows the drive for the cylinder 20 of the pattern reader. The driving lever 69 disposed on the knotting apparatus for the pattern reader is tipped once towards the right, as viewed in FIG. 2, and then back again, upon each revolution of the cam plates, by an elevation provided on one of the cam plates. The driving lever 69 acts upon a lever 180 shown in FIG. 24. Via a rod 181, the lever 180 presses the knob 21 against the traction of a spring 182 towards the right, as viewed in FIG. 24. Teeth 183 on the outside circumference of the knob 21 mesh with inside teeth 184 of a notched index wheel 185, on the one hand, and frontal teeth 186 of the knob 21 mesh with teeth 188 on the inner circumference of a driver wheel 187, on the other hand. A stop or locking ball 191 engages teeth 190 provided on the outside edge 189 of the index wheel 185. The index wheel 185 is not rigidly disposed longitudinally, but can be turned by hand with the knob 21, whereby the driver wheel 187 is also turned. A pinion 192 connected to the driver wheel 187 engages outer teeth 193 of a driving wheel 194 for the cylinder. An inner spring 195 concentric with the spring 182 presses the driver wheel 187 against the notched index wheel 185. When the lever 180 is operated, i.e., when the knob 21 is displaced towards the right and thereafter towards the left again, rotation of the driver wheel 187 takes place, and thus rotation of the cylinder with the pattern situated thereon.

The transmission of the linear movement of the lever 180 into a rotary movement of the driver wheel 187 will now be explained in more detail with reference to the three gearwheels shown in FIG. 25. When the lever 180 moves to the right, the outer teeth 183 of the knob 21 disengage from the inner teeth 188 of the driver wheel 187. The outer teeth 183 of the knob 21 remain in engagement with the inner teeth 184 of the index wheel 185, however. The middle tooth 196 of frontal teeth 197 of the driver wheel 187 now slides with its inclined face along the inclined face of a tooth 198 of frontal teeth 199 of the index wheel 185, since the spring 195 presses the driver wheel against the index wheel 187. This brings about a first rotary movement of the driver wheel 187. When the lever 180 moves back towards the left, as viewed in FIG. 25, the frontal teeth 186 of the knob 21 cooperate with the inside teeth 188 of the driver wheel 187 in such a way that the inclined faces of the teeth 188 on the driver wheel 187 slide along the inclined faces of the teeth 186 of the knob 21, and the driver wheel 187 effects a second rotary movement. The driver wheel 187 is thereupon displaced somewhat to the left owing to the cooperation of its frontal teeth 197 with the frontal teeth 199 of the index wheel 185. The knob 21, the index wheel 185, and the driver wheel 187 are now interconnected by their teeth for joint rotation.

With the aid of the drawing figures which now follow, the course of movement of the individual tools of the knotting apparatus shall be described in more detail.

Figure 26:
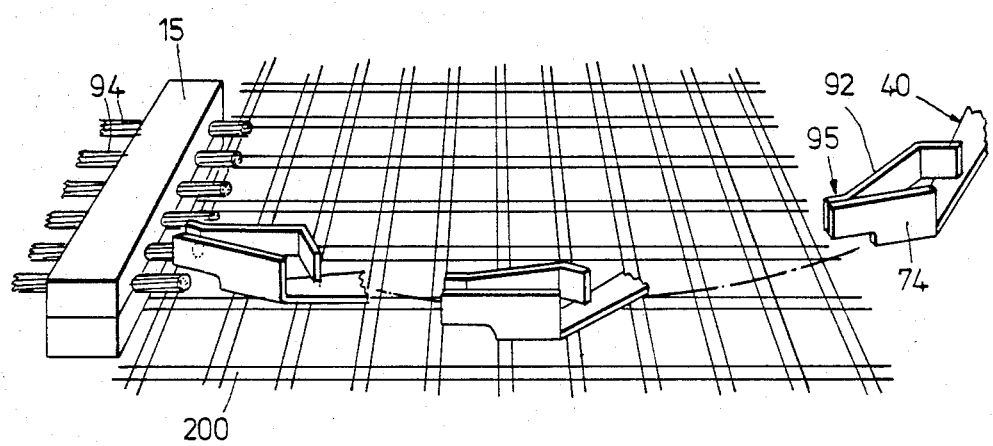

FIG. 26 shows the movement of the wool drawer 40. Upon the movement to the left according to FIG. 26, the drawing tongs 95 open to grasp the desired yarn 94. In the third position of the wool drawer 40 according to FIG. 26, the two gripping arms 74 and 92 move towards one another, whereby the drawing tongs are closed. The canvas 200 is situated beneath the yarn cassette 15 and the wool drawer 40. In the present knotting operation, double-threaded canvas is used.

Figure 27:
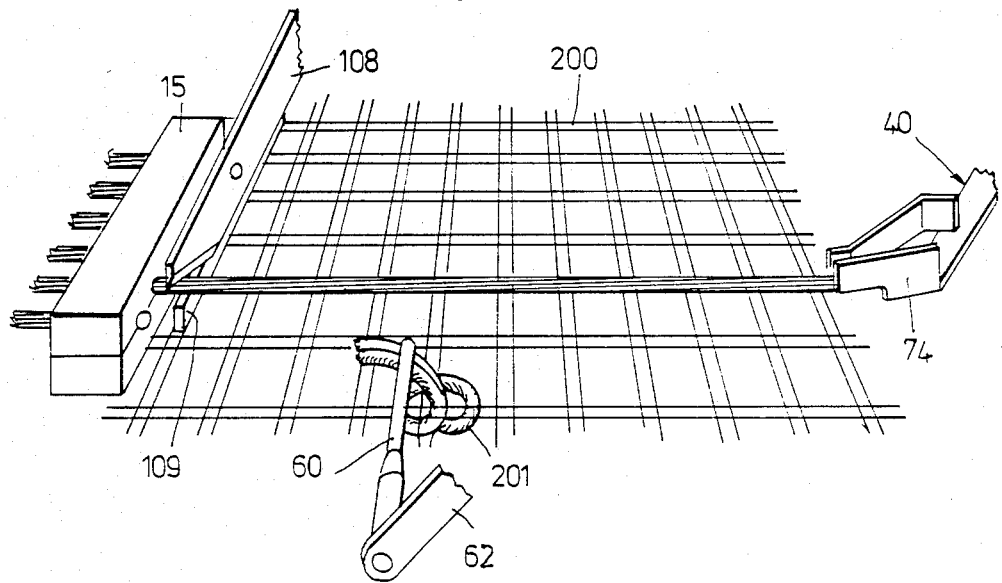

In FIG. 27, the wool drawer 40 is shown in a position in which it has drawn the necessary length of yarn out of the yarn cassette. At the cassette end, the yarn 94 is situated between the cutting knife 108 and the counter-knife 109, which form shears. In this position, the deflector pin 60 of the wool barrier, actuated by the driving lever 61 and the crank arm 62, pushes aside the last-tied knot 201 in the canvas.

In the position according to FIG. 28, the yarn 94 is still stretched by the wool drawer 40, the last-tied knot 201 pushed aside by the pin 60. The knotting head 55 is already displaced downwardly so far that the needle 45 pierces the canvas 200.

The situation as illustrated in FIG. 29 is now that the two snaring arms 78 and 79 have been brought forward towards the yarn 94 by the swinging arm 77. The two pawls 80 and 81 are opened and grasp the yarn 94.

In the top plan view of the snaring arms 78 and 79 according to FIG. 30, the lateral control slides 82 and 83 which open the pawls 80 and 81 are also shown.

In the position according to FIG. 31, the snaring arms 78 and 79 have closed again and have laid the yarn 94, meanwhile cut off by the knife 108, about the neck 141 of the needle.

Figure 32:
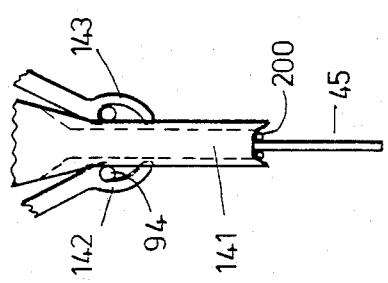

FIG. 32 shows how the two cross-arms 46 grasp the yarn 94 with their end portions 142 and 143 in order to push it downwards along the neck 141 of the needle. The needle neck 141 is then resting on the canvas.

Figure 33:
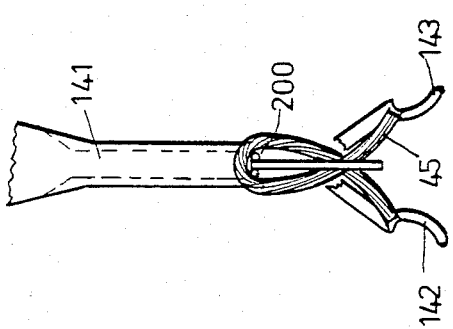

In the position according to FIG. 33, the cross-arms 46 sliding downwards along the needle neck have laid the piece of yarn 94 over the canvas 200 with their front ends 142 and 143 and have led the two ends of the yarn diagonally through the needle apertures 114 and 115.

Figure 34:
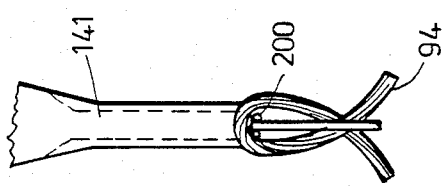

In the position according to FIG. 34, the two cross-arms 46 have been retracted again by their respective driving lever. The cut-off yarn 94 is in the same position relative to the needle and canvas as in FIG. 33.

In the situation illustrated in FIG. 35, the needle 45 has been pulled up above the canvas 200 again by its respective driving lever. The cut-off yarn 94 now forms a knot in the canvas 200, namely, a so-called Turkish knot.

The course of movement of the individual tools of the knotting apparatus is shown in graph form in FIG. 36. The curves illustrate the individual movements, viz., the curve 202 that of the feed drive, the curve 203 that of the wool drawer, the broken-line curve 204 that of the movable gripper arm of the wool drawer, the curve 205 that of the snaring arms, the broken-line curve 206 that of the pawls of the snaring arms, the curve 207 that of the knife, the curve 208 that of the wool barrier, the curve 209 that of the needle stroke, the curve 210 that of the cross-arms, and the curve 211 that of the pattern-reader drive. From these curves, it is apparent, for example, that the movement of the snaring arms begins when that of the wool drawer has already ended. The cutting operation begins when the pawls of the snaring arms have reclosed. After the cutting operation has finished, the grippers of the wool drawer open so that the snaring arms can lay the yarn about the neck of the needle. As is further apparent from the graph, the movement of the knotting apparatus over the knotting bed takes place at the start of the knotting operation, and the actuation of the drive for the pattern reader towards the end of the knotting operation.

Instead of the pattern reader, it would be possible to use an electronic display which would indicate the respective colors as a sequence of numbers or even carry out the color selection automatically via a stepping motor.

Various types of canvas may be used with the knotting apparatus, e.g., normal canvas with 13 knots/10 cm and fine canvas with 18 knots/10 cm.

What is claimed is:

1. A method of making rugs by double knotting, of the type wherein a knotting apparatus is transported by a drive mechanism over a double-thread canvas fixed on a canvas holder, and the knotting yarn is fed by feed means, comprising the steps of:
- setting cam plates in rotation by means of the drive mechanism for actuating various tools for carrying out the knotting operation,
- drawing the yarn to be knotted into the knotting zone by means of first yarn-transport means,
- conveying the yarn into the region of a needle by means of second yarn-transport means,
- pushing the needle between the two threads of a double-thread pair in the canvas,
- cutting off a piece of yarn,
- leading both ends of the piece of yarn through the needle aperture by means of third yarn-transport means, and
- retracting the needle to form a knot.

2. A method in accordance with claim 1, wherein the yarn is partially wound around the neck of a needle by means of the second yarn-transport means taking the form of snaring arms.

3. A method in accordance with claim 1, wherein the last-tied knot is pushed away from the knotting location during the knotting operation by a retaining means.

4. A method in accordance with claim 1, wherein a centering pin for fixing the knotting apparatus relative to the canvas is pushed through the canvas holder simultaneously with the needle.

5. A method in accordance with claim 1, wherein a driving lever controlled by the drive mechanism advances a pattern provided in a pattern reader for determining the yarn color to be used for knotting.

6. A method in accordance with claim 1, wherein the yarn color to be used for knotting according to the pattern is selected with the feed means.

7. A method in accordance with claim 6, wherein the operation of the feed means for the color selection of the yarn takes place automatically according to a data carrier.

8. Knotting apertures for making rugs by double knotting, said apparatus being of the type having a drive mechanism for transporting the apparatus over a canvas holder and a feed means for feeding knotting yarn, said apparatus comprising:
- a plurality of tools for carrying out a knotting operation,
- a needle having at least one aperture,
- a plurality of cam plates rotatable by said drive mechanism for actuating said tools,
- first yarn-transport means for transporting said yarn from said feed means to a knotting zone,
- second yarn-transport means for conveying said yarn into the region of said needle,
- third yarn-transport means for leading said yarn through said at least one aperture, and
- cutting-off means.

9. Apparatus in accordance with claim 8, wherein the first yarn-transport means takes the form of drawing tongs provided with two movable gripper arms.

10. Apparatus in accordance with claim 8, wherein the second yarn-transport means comprises two snaring arms pivotable towards one another and provided with pawls for grasping the yarn.

11. Apparatus in accordance with claim 8, wherein the third yarn-transport means comprises two cross-arms disposed parallel to the needle.

12. Apparatus in accordance with claim 8, wherein a retaining means is provided for the last-tied knot.

13. Apparatus in accordance with claim 8, wherein a centering pin disposed parallel to the needle and displaceable therewith is provided for fixing the knotting apparatus on the canvas holder.

14. Apparatus in accordance with claim 8, wherein the feed means takes the form of a yarn cassette detachably fastened to the apparatus.

15. A pattern reader for use with the knotting apparatus in accordance with claim 8, comprising a cylinder for guiding a pattern for determining the yarn color to be used for the knotting, drive means for rotating the cylinder, and an indicator means.

16. A canvas holder for use with the knotting apparatus in accordance with claim 8, comprising a upwardly swivellable rack rail for guiding the knotting apparatus, holding teeth for insertion of a centering pin, and holding lugs for the canvas.

* * * * *